(12) United States Patent
Vass et al.

(10) Patent No.: US 8,825,790 B2
(45) Date of Patent: Sep. 2, 2014

(54) CACHING OF FRAGMENTED STREAMING MEDIA

(75) Inventors: Jozsef Vass, Los Gatos, CA (US); Adam Lane, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 357 days.

(21) Appl. No.: 13/413,618

(22) Filed: Mar. 6, 2012

(65) Prior Publication Data

US 2013/0238740 A1 Sep. 12, 2013

(51) Int. Cl.
*G06F 15/167* (2006.01)

(52) U.S. Cl.
USPC .......................................................... 709/213

(58) Field of Classification Search
CPC .. H04L 65/60; H04N 21/472; H04N 21/8455; H04N 21/26258
USPC ........ 709/213, 231; 725/37, 61; 707/741, 745
See application file for complete search history.

(56) References Cited

U.S. PATENT DOCUMENTS

| 7,975,225 B2 * | 7/2011 | Li et al. .......................... 715/721 |
| 8,583,818 B2 * | 11/2013 | Dhruv et al. ................... 709/231 |
| 2010/0125876 A1 * | 5/2010 | Craner et al. .................... 725/61 |
| 2014/0089518 A1 * | 3/2014 | ZHANG et al. ............... 709/231 |

* cited by examiner

*Primary Examiner* — Vivek Srivastava
*Assistant Examiner* — Karina J Garcia-Ching
(74) *Attorney, Agent, or Firm* — Wolfe-SBMC (57) ABSTRACT

Methods, systems, and apparatus, including computer programs encoded on a computer storage medium, for caching fragmented streaming media, e.g., for caching fragmented media documents streamed in accordance with HTTP, are described in this specification. In one aspect, a system including means for obtaining, locally, fragments of a media document from a remote media source based on a manifest that refers to storage locations where the fragments are stored at the remote media source. Further, the system includes means for generating index points into a locally cached media item of the obtained fragments, the generated index points being different from any index point of the manifest. Additionally, the system includes means for playing the locally cached media item based on the generated index points.

20 Claims, 3 Drawing Sheets

CACHING OF FRAGMENTED STREAMING MEDIA

BACKGROUND

This specification relates to caching of fragmented streaming media, for example to disk caching of fragmented media documents streamed in accordance with Hypertext Transfer Protocol (HTTP).

HTTP has become a standard protocol for Web communications. Consequently, technologies have been developed and have become available for optimizing HTTP delivery of content. The basic principles of HTTP streaming involve using software on a server to break a media stream into small fragments, and to create a playlist for informing a media player client where to get the files that make up a complete media stream. The media player client downloads the files and plays the small fragments included in the downloaded files in an order specified by the playlist.

SUMMARY

This specification describes technologies relating to caching of fragmented streaming media, for example to caching of fragmented media documents streamed in accordance with HTTP.

In general, one innovative aspect of the subject matter described in this specification can be embodied in a method that includes receiving, at a client system from a server system, a manifest for a media document stored as multiple media document fragments on a persistent storage medium associated with the server system. For example, the server system is an HTTP server system. Each one of the multiple fragments has an associated time and includes an associated media data item. The manifest comprises indicators of storage locations on the persistent storage medium associated with the server system corresponding to respective time offsets of the multiple fragments. The method also includes requesting, based on the manifest, from the server system two or more fragments from among the multiple fragments using corresponding separate requests, and receiving, from the server system, two or more responses including the respective two or more requested fragments. For each received fragment of the two or more received fragments, the method includes caching the received fragment on a persistent storage medium associated with the client system, generating two or more index points that correspond to respective portions of a media data item associated with the received fragment cached on the persistent storage medium associated with the client system, and storing, in a cache index, two or more indicators of storage locations on the persistent storage medium associated with the client system corresponding to the respective two or more generated index points. The method also includes processing an instruction to play back a portion of a media data item associated with a cached fragment of the two or more fragments cached on the persistent storage medium associated with the client. The instruction includes an index point from among the generated index points referenced by the cache index that corresponds to the portion of the media data item referenced by the instruction. Further, the method includes retrieving, from the cache index and in response to the instruction, an indicator of a storage location on the persistent storage medium associated with the client system corresponding to the index point, and accessing, at the storage location on the persistent storage medium associated with the client system, where the portion of the media data item is referenced by the instruction. Additionally, the method includes playing back the accessed portion of the media data item referenced by the instruction.

Other embodiments of this aspect include corresponding computer systems, apparatus, and computer programs recorded on one or more computer storage devices, each configured to perform the method. A system of one or more computers can be so configured by virtue of software, firmware, hardware, or a combination of them installed on the system that in operation cause the system to perform the method. One or more computer programs can be so configured by virtue of having instructions that, when executed by data processing apparatus, cause the apparatus to perform the method.

The foregoing and other embodiments can each optionally include one or more of the following features, alone or in combination. The method can include updating, for each fragment of the two or more received fragments, a data structure to indicate that the fragment has been received at the client system. Further, the method can include receiving a seek point, and checking the data structure to determine whether a given fragment of the multiple fragments corresponding to the seek point has been received at the client system. In response to determining that the given fragment has been received at the client system, the method can include retrieving, from the cache index, an indicator of a storage location on the persistent storage medium associated with the client system that corresponds to a given index point preceding the seek point from among the two or more index points that correspond to respective portions of a given media data item associated with the received given fragment, and accessing, at the storage location that corresponds to the given index point, a portion of the given media data item that corresponds to the given index point. In response to determining that the given fragment has not been received at the client system, the method can include retrieving, from the manifest, an indicator of a storage location on the persistent storage medium associated with the server system that corresponds to a time offset of a given fragment of the multiple fragments corresponding to the seek point, and requesting, from the server system based on the storage location indicator retrieved from the manifest, the given fragment that corresponds to the seek point.

For each fragment of the two or more received fragments, caching the fragment on the persistent storage medium associated with the client system can include determining whether a currently received fragment is sequential in time to a previously received fragment. In response to determining that the currently and previously received fragments are sequential in time, appending the currently received fragment to a single file that stores the previously received fragment. In response to determining that the currently and previously received fragments are not sequential in time, storing the currently received fragment to another, different file.

For each fragment of the two or more received fragments, the two or more generated index points correspond to time offsets of respective two or more key frames of the media data item included in the fragment.

In some implementations, the storage location indicators stored in the manifest include one or more of uniform resource locators or byte offsets corresponding to where respective fragments of the media document are stored on the persistent storage medium associated with the server system. In some implementations, for each received fragment of the two or more received fragments, the storage location indicators stored in the cache index include one or more of an identifier of an associated file or byte offsets corresponding to where respective portions of the media item associated with the received fragment are cached on the persistent storage medium associated with the client system. In some implementations, the persistent storage medium associated with the client system comprises a storage device of the client system. In some implementations, the persistent storage medium associated with the client system comprises a circular buffer of a memory of the client system.

According to another innovative aspect, the described subject matter can also be implemented in a system including means for obtaining, locally, fragments of a media document from a remote media source based on a manifest that refers to storage locations where the fragments are stored at the remote media source. Further, the system includes means for generating index points into a locally cached media item of the obtained fragments, the generated index points being different from any index point of the manifest. Additionally, the system includes means for playing the locally cached media item based on the generated index points.

The foregoing and other embodiments can each optionally include one or more of the following features, alone or in combination. The system can include data structure means for indicating updates to the fragments that have been obtained. In some implementations, the means for playing can include a computer system programmed to effect a media player that receives a seek point, and checks the data structure means to determine whether a given fragment corresponding to the seek point has been obtained at the system. If the given fragment has been obtained at the system, the media player accesses a locally cached portion of a media item of the given fragment. The accessed portion corresponds to a generated index point preceding the seek point. If the given fragment has not been obtained at the system, the media player requests from the remote media source based on the manifest, the given fragment that corresponds to the seek point.

In some implementations, the system can include means for caching a currently received fragment either appended to a single file or stored to another file responsive to whether or not the currently received fragment is sequential in time to a previously received fragment. The single file stores the previously received fragment. In some implementation, for each fragment of the obtained fragments, the generated index points correspond to times of respective key frames of the media item included in the fragments.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Technologies relating to caching of fragmented streaming media are described, for example to caching of fragmented media documents streamed in accordance with HTTP.

Particular embodiments of the subject matter described in this specification can be implemented so as to realize one or more of the following potential advantages. This technology allows playing fragmented video files (which are easy to cache at proxy servers and can be optimally used for forward seek requests) by receiving fragments of a video file, caching the received fragments in persistent storage (e.g., to disk) and loading in memory (e.g., in the playback buffer) only data to be played right away (in progressive download manner.) Playback buffer overload can be avoided in this manner. Because the media document is stored as fragments of the media document at the streaming server, the latter need not be configured to respond to a forward seek request by breaking/interrupting a current stream and subscribing to another stream starting with the requested seek point. Instead, a client can request the fragment of the media document that corresponds to the seek point.

Moreover, according to the disclosed technologies, downloaded fragments of the media document can be cached in persistent storage medium at the client system. Thus, when the media player requests a backward seek, the media player can retrieve a media portion corresponding to the seek request from persistent storage associated with the client system without having to request from the streaming server a fragment corresponding to the seek request. Further, the systems and processes described in this specification enable the client to allocate to the media player a portion of the persistent storage associated with the client system that is not shared with other applications, e.g., with the browser in which the media player may be embedded. Hence, the media player does not have to subscribe to caching policies set forth by the browser.

The described technologies can be used to implement late binding of audio. A media file can contain multiple audio tracks, and the video player can select which audio track to use before sending data to a media buffer. Further, the described media player can avoid using scripting instructions, and thus requires a smaller memory buffer than other media players that use scripting instructions. Additionally, the systems and techniques described in this specification allow caching of unprotected or protected media content to persistent storage associated with the client system.

Figure 1:
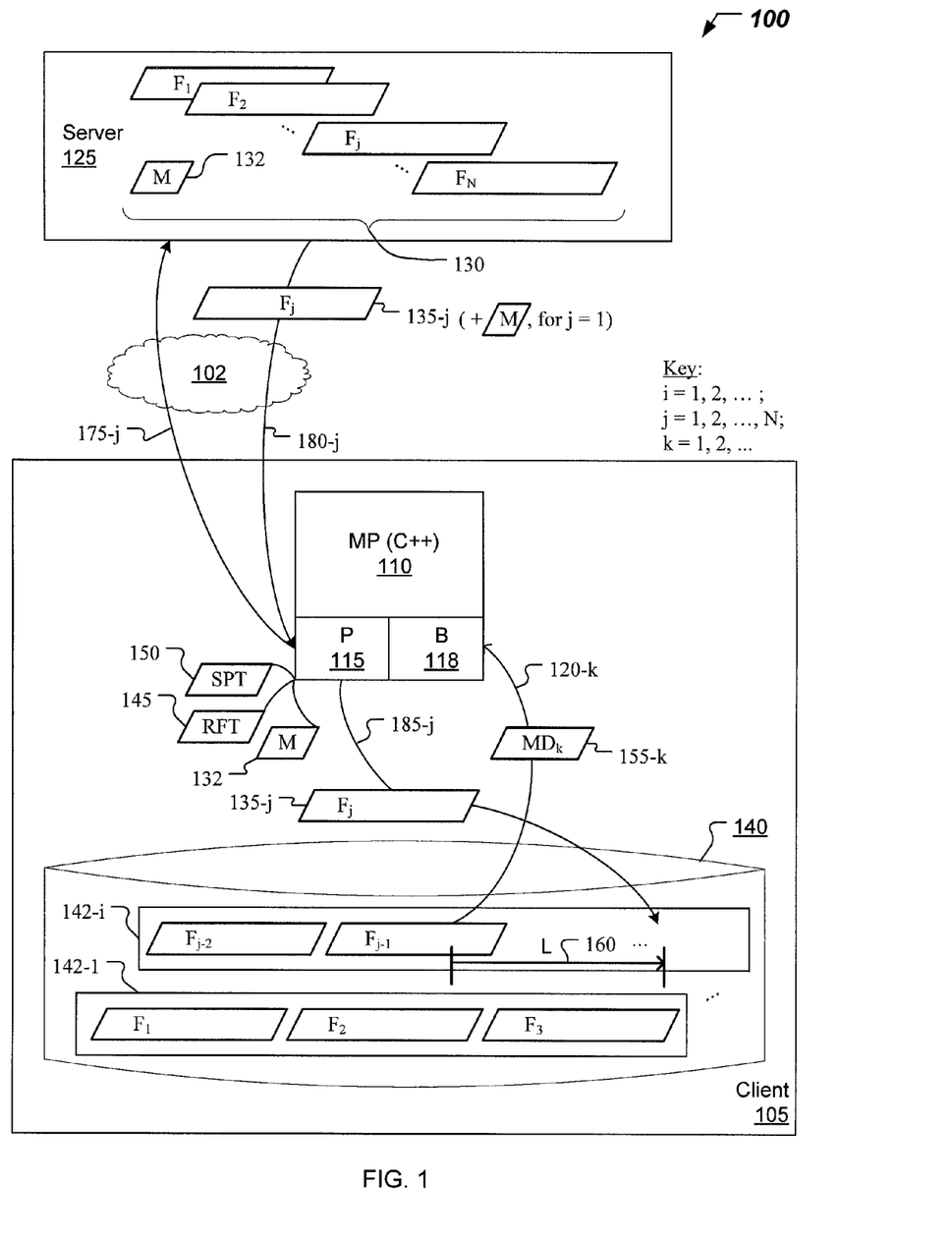
FIG. 1 shows an example of a system used for conducting media streaming.

FIG. 1 shows an example of a system 100 that is used by a client system to cache fragments of a media document that is being streamed by a server system. The system 100 includes a client system 105 that is communicatively coupled with a server system 125 through a communication network 102. The communication network can be private, e.g. a company local or wide access network, or public, e.g., the Internet. Communications between the client 105 and the server 125 can be in accordance with Hypertext Transfer Protocol (HTTP).

The server 125 can be a media source for the client 105. The media can be video that includes a timed sequence of image frames and audio data. In some implementations, the server 125 can store one or more media documents to be streamed on demand to the client system 105. In this case, the server 125 can store the one or more media documents on a persistent storage medium associated with the server 125. The storage medium associated with the server system 125 can be part of a storage system, e.g., a hard drive, a storage area network (SAN), a network-attached storage (NAS), non-volatile memory (e.g., Flash memory) or the like. In some implementations, the server 125 can be an origin server or a proxy server (e.g., an intermediary or an edge server) of a content distribution network. In some implementations, the server 125 can be associated with one or more image capture systems, e.g., video cameras. In this case, the server 125 can process the captured images, generate one or more media documents from the processed images and stream live or near-live the one or more generated media documents to the client system 105.

A media document 130 can include video that has playback duration of 2, 6 or 12 minutes, or 20, 60 or 120 minutes, for instance. In some implementations, the media document 130 can be generated and stored as multiple fragments 135-$j$, $j=1$, N, of the media document 130. The fragments of the media document can include video data having playback duration of, e.g., 10 or 15 seconds. Moreover, the fragments of the media document correspond to time offsets of the media document 130. For instance, when the media document 130 has playback duration of 10 minutes and is stored in 10-second fragments, a first fragment $F_1$ can correspond to a time offset at the beginning of the media document, $T_1=0$; a second fragment $F_2$ can correspond to a time offset $T_2=10$ sec; a third fragment $F_3$ can correspond to a time offset $T_3=20$ sec; and so on, the $N^{th}$ fragment $F_N$ can correspond to a time offset $T_N=590$ sec. In some implementations, a fragment $F_j$ having an associated time offset $T_j$ can be stored in a single file on the persistent storage medium associated with the server 125, at a storage location corresponding to the file of the fragment $F_j$. In some implementations, multiple fragments of the media document 130 can be stored in a single file. For instance, all N fragments of the media documents 130 can be stored in a single file. To track storage locations, on the persistent storage associated with the server 125, where the fragments of the media document 130 are stored, the server 125 maintains a manifest (M) 132. The manifest 132 can map the time offsets $T_j$ of the fragments $F_j$ to corresponding indicators of storage locations where the respective the fragments $F_j$ are stored. For example, the storage location indicators can be uniform resource locator (URL) addresses where the respective fragments are stored. The manifest 132 can include entries such as $T_1$: http://www.xyz.com/media_document_i/fragment1, . . . , $T_j$: http://www.xyz.com/media_document_i/fragmentj, . . . , for instance. As another example, the storage location indicators can be paths of a file system associated with the persistent storage medium of the server system 125 where the one or more files storing the N fragments of the media document 130 are located. As yet another example, the storage location indicators can be byte offsets of the persistent storage medium associated with the server system 125 where the respective fragments are stored.

In this manner, the server system 125 can provide the manifest 132 associated with the media document 130 to the client 105 upfront, upon receiving a request from the client system 105 to stream the media document 130. Subsequently, the client system 105 can request 175-$j$ from the server system 125 a fragment $F_j$ corresponding to a time $T_j$ of a media document 130, either to maintain progressive playback of the media document 130 or in response to a seek request to a seek point of the media document 130 that corresponds to the fragment $F_j$. In such implementations, the message transmitted 175-$j$ by the client system 105 requesting the fragment $F_j$ can be an HTTP request to get the requested fragment $F_j$. The HTTP request includes an indication of storage location of the fragment Fj on the persistent storage medium associated with the server system 125. The client system 105 knows the storage location indication of a fragment $F_j$, because the latter is available in the manifest 132 downloaded to the client system 105. In case the server system 125 delivers a live media stream, new fragments are being added to the media document 130. The server 125 repeatedly updates the manifest with time offsets and storage locations corresponding to the newly added fragments. In addition, the server 125 can send the updated manifest 132 to the client system 105 receiving the live media stream. Additional details about generating, storing and HTTP streaming fragments of a media document can be found in literature.

The client system 105 can be a workstation or a mobile computer system, for instance. Examples of mobile computer systems are tablet computers, smart phones, and the like. The client system 105 includes one or more hardware processors, random access memory (referred to as memory) and persistent storage medium. The one or more processors of the client system 105 can process instructions associated with code of a media player 110 to playback the media document 130 streamed by the server system 125. The media player code can be compiled C code, C++ code or other non-scripting programming languages. In some implementations, the code of the media player 110 can be executed by the one or more processors of the client system 105 as a stand-alone, non-embedded application operating within the operating system of the client system 105. For example, the media player 110 can be a stand-alone video player configured to play streaming video. In some implementations, the media player 110 can be executed by the one or more processors of the client system 105 as an application embedded in another application running within the operating system of the client system 105. The other application can be, e.g., a browser program or application execution environment running within the operating system, and the media player 110 can be a video player embedded in the browser program or application execution environment.

The persistent storage medium of the client system 105 can be part of a hard drive, solid-state drive, storage card, or other persistent storage devices of the client system 105. The one or more processors of the client system 105 can allocate a portion 140 of the persistent storage medium of the client system 105 to be used by the media player 110 to cache the downloaded portions of the media document 130. This portion of the persistent storage medium of the client system 105 is referred to as disk cache 140. In some cases, the client system 105 does not include a persistent storage device similar to the devices enumerated above, e.g., in the case of a mobile device having minimal computation resources, such as a player device worn by a user during workouts. In the latter cases, the one or more processors of the client system 105 can allocate a circular memory buffer of the client system 105 to be used by the media player 110 to cache the downloaded portions of the media document 130.

Whether running as a stand-alone application or embedded in another application, the disk cache 140 is allocated, by the one or more processors of the client system 105, solely to the media player 110 and is not shared with other applications. For instance, when the media player 110 is embedded in a browser program, the one or more processors of the client system 105 allocate to the browser program another portion of the persistent storage medium of the client system 105 for caching browser content, such that the portion of the persistent storage medium allocated to the browser program is different from the disk cache 140 allocated to the media player 110. Also, rules for caching browser content in the portion of the persistent storage medium allocated to the browser program can be different from rules for caching downloaded fragments of a media document 130 in the disk cache 140 allocated to the media player 110. Such different caching rules can include, e.g., cache retention and refresh policies, overall cache size, unit cache size, and the like.

In addition, the one or more processors of the client system 105 can allocate a portion 115 of the memory of the client system 105 to store media data associated with the media document 130. This portion of the memory of the client system 105 is referred to as player memory 115. Portions of the media data stored in the player memory 115 include content data associated with the media document 130 that is currently played back by the media player 110. Other portions of the media data stored in the player memory 115 are included in data structures 145, 150 used by the media player 110 to manage fragments of the media document 130 that were previously downloaded from the server system 125 and are cached on the disk cache 140. Example implementations of data structures 145, 150 included in the media data stored in the player memory 115 are described in detail below. Further portions of the media data stored in the player memory 115 are included in the manifest 132 downloaded from the servers system 125 and used by the media player 110 to request from the server system 125 other fragments of the media document 130. Additionally, the one or more processors of the client system 105 can allocate another portion 118 of the memory of the client system 105 to store content data associated with the media document 130 to be progressively played back by the media player 110. This portion of the memory of the client system 105 is referred to as media buffer 118. The size of the media buffer 118 can accommodate 1, 2, or 5 seconds of video, for example. A portion of a media content data item 155-$k$ can be accessed by the media player 110 in a file 142-$i$ cached in the cache disk 140. The accessed portion of the media content data item 155-$k$ can be buffered 120-$k$ by the media player 110 to the media buffer 118. An example of a process used by the media player 110 to progressively playback media content data cached in disk cache 140 is described below in connection with FIG. 2A.

A current media streaming session has started when the media player 110 transmitted 175-($j$=1) a message to a video source, e.g., the server system 125, requesting that the server system 125 stream a media document 130. The message can be an HTTP request to get the media document 130. The media player received 180-($j$=1) from the server system 125 a response message including a first fragment $F_1$ of a timed-sequence of N fragments of the media document 130, and a manifest (M) 132 associated with the media document. Each fragment $F_j$ 135-$j$ of the multiple fragments $F_1, F_2, \ldots, F_N$, has an associated time offset $T_j$ and includes an associated media content data item. The manifest 132 includes indicators of storage locations on the persistent storage medium associated with the server system 125 where the fragments $F_1, F_2, \ldots, F_N$ corresponding to respective time offsets $T_1, T_2, \ldots, T_N$ are stored. The manifest 132 can be stored by the media player 110 in the player memory 115.

The media player 110 can request another fragment $F_{j>1}$ of the media document 130, other than the first fragment $F_1$, in order to address either a progressive playback instruction or a seek instruction. To prepare the request, the media player 110 can retrieve from the manifest 132 stored in the player memory 115 an indicator of storage location, on the persistent storage medium associated with the server system 125, corresponding to the fragment $F_j$. Unless otherwise specified, the fragment index "j" refers to fragments other than the first fragment $F_1$, i.e., j>1. The retrieved storage location indicator can be inserted by the media player 110 in an HTTP message transmitted 175-$j$ to the server system 125 requesting the fragment $F_j$. In general, the media player can receive 180-$j$ from the server system 125 a response message including the requested fragment $F_j$.

Once the first fragment $F_1$ was received at the client system 105, the media player 110 cached 185-($j$=1) the received first fragment $F_1$ to the disk cache 140. When the first fragment $F_1$ of a media document 130 was received, the media player 110 also generated a new file 142-1 to cache the first fragment $F_1$ therein. Other fragments downloaded in progressive fashion $F_2, F_3$ since the first fragment $F_1$ has been downloaded are cached 185-2, 185-3 in the same, single file 142-1, by appending the fragment downloaded most recently in progressive manner at the end of the single file 142-1. In the example illustrated in FIG. 1, the media player 110 generated a new file 142-$i$ (where i>1) and cached 185-($j$−2) therein another most recently downloaded fragment, e.g., $F_{j-2}$, where j>5. In this example, the fragment $F_{j-2}$ was downloaded to address a forward seek instruction, when the media player 110 requested from the server system 125 the fragment $F_{j-2}$ corresponding to a seek point succeeding a (then) current playback time. Other fragments downloaded in progressive fashion, $F_{j-1}, F_j$, after the fragment $F_{j-2}$ are cached 185-($j$−1), 185-$j$ in the same, single file 142-$i$. By generating a new single file to cache a fragment of the media document downloaded to address a seek forward instruction, a timed-sequence of fragments cached by the media player 110 in each of the cache files 142-1, …, 142-$i$, … has no time discontinuities.

While caching 185-($j \geq 1$) a downloaded fragment $F_j$ to a file 142-($i \geq 1$), the media player 110 can parse the media content data item included in the fragment $F_j$. In case the media document 130 is a video, the media player 110 can identify time offsets of key frames included in the video content data item of a fragment $F_j$ of the video 130. A key frame of the video 130 can be decoded by the media player 110 without using data associated with other key frames or non-key frames of the video 130. Consecutive key frames can be separated in time by about 1 second, for instance. In contrast, a non-key frame of the video 130 can be decoded by the media player 110 by using data associated with at least a key frame or another non-key frame of the video 130. In general, a fragment $F_j$ of the multiple fragments associated with the video 130 can, but need not, start with a key frame. Further, the fragment $F_j$ can correspond to about 10 seconds of the video 130. Therefore, the media player 110 can identify about 10 key frames included in the downloaded fragment $F_j$ of the video 130.

Once the media player 110 identifies the key frames of the first cached fragment $F_1$, the media player 110 generates index points of the first cached fragment $F_1$ as the time offsets corresponding to the identified key frames of the first cached fragment $F_1$. Further, the media player 110 generates the data structure 150 to include the generated index points and indicators of storage locations associated with the disk cache 140 where portions of a video content data item of the first fragment $F_1$ corresponding to the generated index points are cached. This data structure is referred to as a cache index 150. In a similar manner, the media player 110 uses the identified key frames of a most recently cached fragment $F_{j>1}$, for fragments other than the first fragment $F_1$, to generate index points of the fragment $F_j$ as time offsets corresponding to the identified key frames of the fragment $F_j$. Furthermore, the media player 110 can update the cache index 150 to add the most recently generated index points and their indicators of storage locations associated with the disk cache 140 where portions of a video content data item of the most recently cached fragment $F_j$ corresponding to the most recently generated index points are cached.

In some implementations, the indicators of storage locations can include byte offsets of the disk cache 140 where the portions of the video content data item of the fragment $F_j$ corresponding to the respective generated index points are cached. In some implementations, the indicators of storage locations can include file names or file paths on the disk cache

140 where the portions of the video content data item of the fragment $F_j$ corresponding to the generated index points are cached. In some implementations, the indicators of storage locations can include file names and byte offsets of the disk cache 140 where the portions of the video content data item of the fragment $F_j$ corresponding to the generated index points are cached, e.g., fragment $F_1$ of 10 seconds is stored in file 1 at byte 2000, fragment $F_2$ of 10 seconds in stored in file 1 at byte 5000, and so on. Information from the cache index 150 can be used, by the media player 110 during the current streaming session of the video 130, to address a backward seek instruction, as described below in this specification in connection with FIG. 3. For this reason, the cache index 150 also is referred to as a seek point table (SPT) 150.

In some implementations, the media player 110 can generate another data structure 145 to track fragments of the media document 130 that have been downloaded by the media player 110 during the current streaming session. This data structure 145 can include at least time offsets corresponding to the fragments of the media document 130 downloaded by the client system 105. Such data structure can be referred to as a received fragment table (RFT) 145. Information from the RFT 145 can be used, by the media player 110, to determine whether a portion of a media content item corresponding to a seek point may be cached on the cache disk 140, as described below in this specification in connection with FIG. 3. Once the fragment $F_j$ is received 180-$j$ at the client system 105, the media player 110 can update the RFT 145 to indicate that the fragment $F_j$ corresponding to the time offset $T_j$ has been downloaded by the media player 110 during the current streaming session.

In some cases, the one or more processors of the client system 105 can allocate effectively unlimited disk cache 140 for caching the downloaded fragments of the media document 130. In such cases, in the absence of receiving a seek request from a user associated with the client system 105, the media player 110 can progressively download and cache fragments of the media document 130 until the entire media document 130 is downloaded and cached to the disk cache 140.

In most cases, however, the size of disk cache 140 that the one or more processors of the client system 105 can allocate for caching the downloaded fragments of the media document 130 is limited. Typically, the limitation depends on a size of storage resources available to the client system 105. For example, a laptop computer may have a disk cache 140 that can fit a 90 minute video, a smart phone may have a disk cache 140 that can fit a 6 minute video, and a player device worn by a user during workouts may have a disk cache 140 that can fit a 30 second video. In some implementations, when the size of disk cache 140 allocated for caching downloaded fragments is limited, the media player 110 can stop downloading additional fragments from the server system 125 when the maximum capacity of the disk cache 140 is hit. As progressive playback consumes cached media content data from the disk cache 140, the media player 110 can download and cache additional fragments of the media document to replenish the consumed cached media content data. In other implementations, when the size of disk cache 140 allocated for caching downloaded fragments is limited, the media player 110 can monitor a size "L" 160 of a portion of media content data cached in the disk cache 140 that succeeds the current playback time. The size 160 is determined by interplay of the progressive playing back and cache replenishing. When the media document 130 is a video, the size 160 can be expressed in time of un-played cached video. For example, the media player 110 can maintain the size 160 larger than a target size of, e.g., at least 30 seconds or 30 minutes of un-played video left in the disk cache 140, by downloading and caching one or more additional fragments when the size 160 decreases under the target size. As another example, the media player 110 can maintain the size 160 between two target sizes, e.g., at least 10 seconds but no more than 3 minutes of un-played video left in the disk cache 140, by downloading and caching additional fragments when the size 160 drifts outside of the range defined by the two target sizes.

In the manner described above, the media player 110 can progressively play back the media content data cached in disk cache 140, and, in parallel to and asynchronously from the progressive playback, replenish the media content data consumed from the disk cache 140 by the progressive playback of the cached media content data.

Figure 2A:
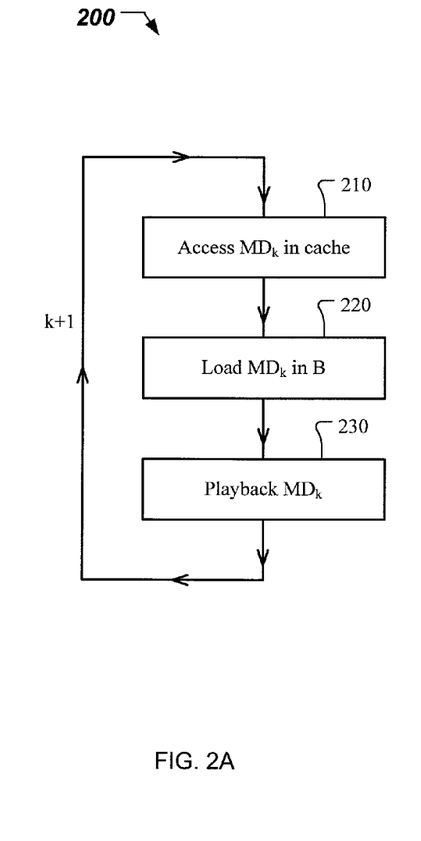
FIG. 2A shows an example of a process used by a computer system to progressively playback cached media.
Figure 2B:
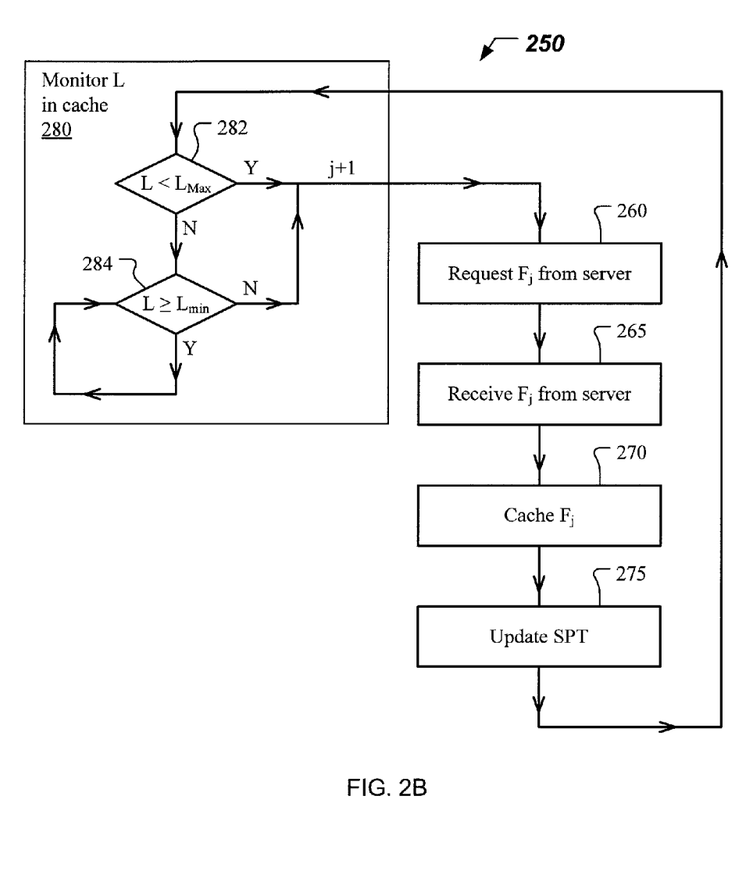
FIG. 2B shows an example of a process used by a computer system to cache streaming media.

FIG. 2A shows an example of a process 200 used by a computer system to progressively playback media content that is cached on a persistent storage medium of the computer system. FIG. 2B shows an example of a process 250 used by a computer system to replenish media content that is cached on persistent storage medium of the computer system, and that is consumed by the computer system. Processes 200 and 250 can be implemented by the media player 110 executing on the client system 105, and the persistent storage medium of the computer system can be implemented as the disk cache 140 of the client system 105, as described above in connection with FIG. 1.

Referring to the progressive playback loop 200 shown in FIG. 2A, at 210, a portion of media data $MD_k$ cached on persistent storage medium of a computer system is accessed. The index "k" is a loop-index, and means that the portion of media data $MD_k$ is progressively played back by the computer system after a portion of media data $MD_{k-1}$ and before a portion of media data $MD_{k+1}$. The portions of media data $MD_{k-1}$, $MD_k$, $MD_{k+1}$ are associated with a media document being progressively streamed to the computer system. In the example implementation illustrated in FIG. 1, the media player 110 can access a portion of a media content data item 155-$k$ that is cached in the disk cache 140. The accessing 210 can be triggered, e.g., when the media player 110 processes an instruction to progressively playback the portion of the media content data item 155-$k$ from a fragment cached on the disk cache 140. In some implementations, the instruction can include an index point from among the generated index points referenced by the cache index 150 that corresponds to the portion of the media content data item 155-$k$. For example, the media player 110 can retrieve, from the cache index 150 and in response to the instruction, a byte offset of the disk cache 140 that corresponds to the index point. In this fashion, the media player 110 can access 210, at the byte offset of the cache disk 140, the portion of the media content data item 155-$k$ referenced by the instruction.

At 220, the accessed portion of media data $MD_k$ is loaded from the persistent storage medium of the computer system to a memory buffer of the computer system. In the example implementation illustrated in FIG. 1, the media player 110 can buffer 120-$k$ the portion of the media content data item 155-$k$ that is cached on the disk cache 140 to the media buffer 118. While stored in the media buffer 118, the media content data item 155-$k$ can be preprocessed by the media player 110 in preparation for playback.

At 230, the portion of media data $MD_k$ buffered in the memory buffer of the computer system is played back. In the example implementation illustrated in FIG. 1, the media player 110 can playback the portion of the media content data item 155-$k$ that is buffered in the media buffer 118. Data generated during playback of the portion of the media content data item 155-$k$ can be stored in the player memory 115. The progressive playback of the media content cached on the persistent storage medium of the computer system can continue by looping, k:=k+1, as many times as necessary through the loop 200. For example, the progressive playback loop 200 can continue until the end of a media document is reached. As another example, the progressive playback loop 200 can continue until the computer system receives a request from a user associated with the computer system to seek to a seek point of the media document. The latter case is described in detail below in connection with FIG. 3.

FIG. 2B illustrates a loop 250 that can be used by a computer system to replenish media content that is cached on the persistent storage medium of the computer system, and that is consumed by the progressive playback loop 200 described above in connection with FIG. 2A. The media content that is progressively played back by the computer system is associated with a media document stored as multiple media document fragments on persistent storage associated with a server system. Each one of the multiple fragments has an associated time offset and includes an associated media data item. Moreover, the replenishing loop 250 is executed by the computer system as part of a media streaming HTTP session during which, the server system progressively streams the media document to the computer system. As part of establishing the media streaming session, the computer system receives from the server system a manifest for the media document. The manifest includes indicators of storage locations on the persistent storage medium associated with the server system corresponding to respective time offsets of the multiple fragments. In some implementations, the storage location indicators referenced in the manifest that correspond to respective time offsets of the multiple fragments include uniform resource locators (URLs) on the persistent storage medium associated with the server system where the multiple fragments are stored, respectively.

At 260, a fragment $F_j$ from among the multiple fragments of the media document stored on persistent storage associated with a server system is requested from the server system. Here, the index "j" is a loop-index, and means that the fragment $F_j$ is requested by the computer system after a fragment $F_{j-1}$ and before a fragment $F_{j+1}$. The fragments $F_{j-1}$, $F_j$, $F_{j+1}$ are from among the N fragments of the media document being progressively streamed to the computer system. The request can be performed by a computer system in response to an instruction to replenish media content that is cached on the persistent storage medium of the computer system. To request the fragment $F_j$ of the media document, the computer system can retrieve from the manifest received from the server system an indicator of storage location, on the persistent storage medium associated with the server system, corresponding to the fragment $F_j$. The storage location indicator retrieved from the manifest can be inserted by the computer system in an HTTP message transmitted 260 to the server system requesting the fragment $F_j$.

At 265, the requested fragment $F_j$ is received from the server system. In some implementations, the computer system receives the fragment $F_j$ as part of a response HTTP message from the server system. Optionally, the computer system can update a data structure to flag the fragment $F_j$ as having been received at the computer system as part of the current media streaming session.

At 270, the received fragment $F_j$ is cached on a persistent storage medium of the computer system. In some implementations, the computer system can cache each received fragment $F_j$ as an individual file. In this case, the computer system may need to manage a quantity of cache files up to a quantity N of the multiple fragments of the media document. In other implementations, the computer system can append the received fragment $F_j$ in a single cache file that was generated when a downloaded fragment, which corresponds to the start of the current progressive playback, was cached. In case progressive playback lasts from the beginning to the end of the media document, the N fragments of the media document can be cached in a single cache file on the persistent storage medium associated with the computer system, provided enough storage space is available.

At 275, a cache index is updated. The cache index is a data structure that is used by the computer system to store index points corresponding to respective portions of a media data item associated with the fragment $F_j$ cached on the persistent storage medium of the computer system, and corresponding storage location indicators to indicate where the respective portions of the media data item associated with the fragment $F_j$ are stored on the persistent storage medium of the computer system. The above-noted storage location indicators can include a file or byte offsets or both of the persistent storage medium of the computer system corresponding to where the respective portions of the media data item associated with the fragment $F_j$ are stored.

The computer system can parse the received fragment $F_j$ while caching 270 the same. In some implementations, the computer system can generate a set of index points corresponding to time offsets of respective key frames of the media data item included in the parsed fragment $F_j$. In this manner, an index point of the generated set of index points corresponds to an associated portion of the media data item of fragment $F_j$, where the portion starts with a key frame associated with the index point and ends at the succeeding key frame. For example, a fragment $F_j$ of a video can correspond to a 10 or 15 second-portion of the video, and separation between consecutive key frames of the video is typically 1 second. Hence, in this case, the computer system can generate 10 or 15 index points for the cached video fragment $F_j$. To update 280 the cache index, the computer system writes the generated index points and their corresponding storage location indicators in the cache index. Information from the updated cache index can be used, by the computer system during the current streaming session, to address a backward seek instruction, as described below in connection with FIG. 3.

At 280, a size "L" of a portion of media data cached on the persistent storage medium of the computer system that succeeds the current playback time is monitored. The portion of the cached media data that succeeds the current playback time can be referred to interchangeably as an un-played cached media data. The size "L" of the un-played cached media data quantifies an interaction between the progressive playback loop 200 and the cache replenishing loop 250. By monitoring 280 the size "L", the computer system can allow the replenishing loop 250 to continue, e.g. set j:=j+1, or can temporarily pause the cache replenishing loop 250. In some implementations, the size "L" of the un-played cached media data can be measured repeatedly, e.g., when the computer system accesses 210 a portion of the media data $MD_k$ in the persistent storage medium of the computer system, as part of the progressive playback loop 200. In other implementations, the size "L" of the un-played cached media data can be measured periodically, at a specified time interval. When the streamed media document is a video file, the specified time interval can be 1, 6 or 60 second(s). To measure the size "L" of the un-played cached media data, the computer system can determine a size of a portion of the cached media data starting at the current playback time and extending forward in time.

As part of the monitoring 280 of the size "L", at 282, the computer system can determine whether the size "L" of the un-played cached media data is less than a first specified size $L_{Max}$. The first specified size $L_{Max}$ specifies that the portion of cached data, which has not been played by the computer system, should not exceed a size of $L_{Max}$. When the streamed media document is a video file, the first specified size $L_{Max}$ can correspond to a 1, 6, 60 or 120 minute-portion of video that succeeds the current playback time. By setting an upper bound to the size of un-played cached media data, the computer system can avoid downloading and caching portions of the media document that a user associated with the computer system may never watch. In response to determining 282-Y that the size "L" of the un-played cached media data is less than the first specified size $L_{Max}$, the computer system can continue the cache replenishing loop 250, by requesting, at 260, a next fragment $F_{j+1}$ from the server system.

In response to determining 282-N that the size "L" of the un-played cached media data is larger than or equal to the first specified size $L_{Max}$, at 284, the computer system can determine whether the size "L" of the un-played cached media data is larger than a second specified size $L_{min}$. The second specified size $L_{min}$ specifies that the portion of cached data, which has not been played by the computer system, should exceed a size of $L_{min}$. When the streamed media document is a video file, the second specified size $L_{min}$ can correspond to a 5-10 second-portion of video that succeeds the current playback time. By setting a lower bound to the size of un-played cached media data, the computer system can increase a likelihood of loading 220 to the play buffer a quantity of cached media data necessary for uninterrupted progressive playback, in accordance with the progressive playback loop 200. In response to determining 284-Y that the size "L" of the un-played cached media data is larger than or equal to the second specified size $L_{min}$, the computer system can temporarily pause the cache replenishing loop 250. While the cache replenishing loop 250 is paused, the progressive playback loop 200 consumes the media data cached in the persistent storage medium of the computer system. In response to determining 284-N that the size "L" of the un-played cached media data is less than or equal to the second specified size $L_{min}$, the computer system can restart the cache replenishing loop 250, by requesting, at 260, a next fragment $F_{j+1}$ from the server system.

In some implementations, the computer system has access to effectively unlimited persistent storage medium space for caching fragments of the streamed media document. For example, the computer system can have access to a SAN or a NAS. In such case, the first specified size described above becomes infinite $L_{Max} \to \infty$. In this case, at 282, the computer system determines 282-Y that the size "L" of the un-played cached media data, which is finite, is always less than the first specified size $L_{Max}$, which is infinite. Hence, when the computer system has access to effectively unlimited persistent storage medium space for caching fragments of the streamed media document, the computer system can perform the cache replenishing loop 250 until the entire media document is downloaded and cached on the unlimited persistent storage medium.

In other implementations, the computer system can implement the cache replenishing loop 250 to maintain the size "L" of the un-played cached media data over a single specified size $L_{min}$. In this case, the first specified size $L_{Max}$ described above is set to be equal to the second specified size, $L_{Max}:=L_{min}$. Hence, at 282, the computer system can determine whether the size "L" of the un-played cached media data is less than a specified size $L_{min}$. The specified size $L_{min}$ specifies that the portion of cached data, which has not been played by the computer system, should exceed a size of $L_{min}$. When the streamed media document is a video file, the specified size $L_{min}$ can correspond to a 10, 30, 60 or 120 second-portion of video that succeeds the current playback time. By setting a lower bound to the size of un-played cached media data, the computer system can increase a likelihood of loading 220 to the play buffer a quantity of cached media data necessary for uninterrupted progressive playback, in accordance with the progressive playback loop 200. In response to determining 282-Y that the size "L" of the un-played cached media data is less than the specified size $L_{min}$, the computer system can continue the cache replenishing loop 250, by requesting, at 260, a next fragment $F_{j+1}$ from the server system. In response to determining 282-N that the size "L" of the un-played cached media data is larger than or equal to the specified size $L_{min}$, at 284, the computer system can temporarily pause the cache replenishing loop 250, in accordance with 284-Y. While the cache replenishing loop 250 is paused, the progressive playback loop 200 consumes the media data cached in the persistent storage medium of the computer system. In response to determining 284-N that the size "L" of the un-played cached media data is less than the specified size $L_{min}$, the computer system can restart the cache replenishing loop 250, by requesting, at 260, a next fragment $F_{j+1}$ from the server system.

In any one of the implementations described above in connection with FIGS. 2A and 2B, the computer system can perform the progressive playback loop 200 in conjunction with the cache replenishing loop 250 until the entire streamed media document is progressively played back.

Figure 3:
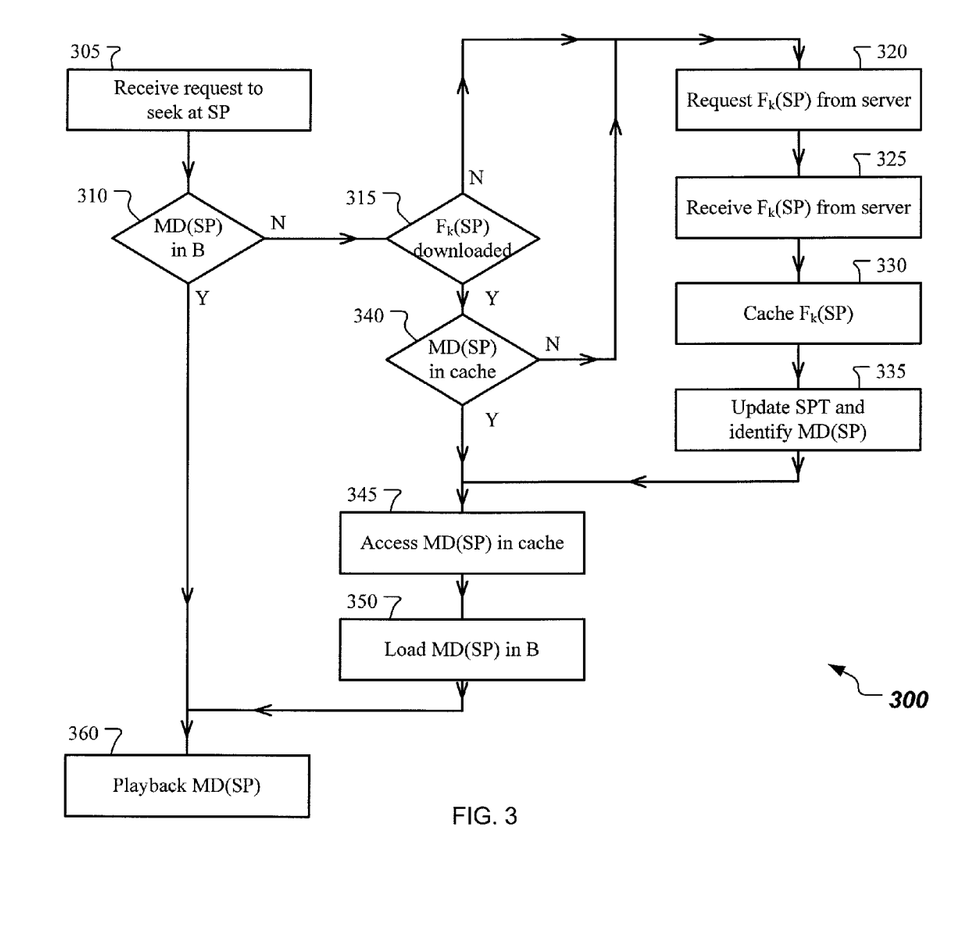
FIG. 3 shows an example of a process used by a computer system to seek to a specified seek point.

FIG. 3 shows a process used by a computer system to respond to a seek request received while performing the progressive playback loop 200 in conjunction with the cache replenishing loop 250. The computer system uses the process 200, as described above in connection with FIG. 2A, to playback a media document streamed from a server system, and the process 250, as described above in connection with FIG. 2B, to cache downloaded fragments of the media document to persistent storage medium of the computer system. For example, process 300 can be implemented by the media player 110 executing on the client system 105 that is in communication with the server system 125, as described above in connection with FIG. 1.

At 305, a seek request to seek to a seek point (SP) of the media document is received. For example, the seek request can be received by the computer system from a user associated with the computer system who specifies a location on a time bar of a user interface. As another example, the seek request can be received by the computer system from an application, which runs on the computer system, via an API. The seek point SP corresponds to a time offset of the media document, $T_{SP}$.

At 310, the computer system determines whether a portion of media data MD(SP) corresponding to the seek point SP is buffered in a media buffer of the computer system. The portion of media data MD(SP) corresponds to the seek point SP if the time offset $T_{SP}$ of the seek point SP (i) is within a time duration of the portion of media data MD(SP) and (ii) succeeds a time offset of a key frame included in the portion of media data MD(SP). In response to determining 310-Y that the portion of media data MD(SP) corresponding to the seek point SP is buffered in the media buffer, at 360, the computer system can playback the buffered portion of media data MD(SP) corresponding to the seek point SP.

In response to determining 310-N that the portion of media data MD(SP) corresponding to the seek point SP is not buffered in the media buffer, at 315, the computer system can determine whether a fragment $F_k(SP)$ of the media document corresponding to the seek point SP has been downloaded by the computer system during the current streaming session. The fragment $F_k(SP)$ corresponds to the seek point SP if the time offset $T_{SP}$ is within the time duration of the fragment $F_k(SP)$. The computer system can estimate a result of the determination 315 based simply on whether the received request was for a backward or forward seek. Most likely, if the seek point SP precedes a current playback time, then the fragment $F_k(SP)$ corresponding to the seek point SP has been downloaded at the computer system as part of the current media streaming session. Else, if the seek point SP succeeds the current playback time, then the fragment $F_k(SP)$ corresponding to the seek point SP has not been downloaded at the computer system as part of the current media streaming session. A determination 315 that is more accurate than the estimation based on whether the request was for a backward or forward seek can be made, based on information from a data structure generated by the computer system, at 265 of the process 250, to track fragments of the media document downloaded at the computer system as part of the current media streaming session. In the example implementation illustrated in FIG. 1, the data structure is referred to as a received fragment table (RFT.)

In response to determining 315-Y that the fragment $F_k(SP)$ corresponding to the seek point SP has been downloaded by the computer system during the current streaming session, at 340, the computer system can determine whether the portion of media data MD(SP) corresponding to the seek point SP is cached on persistent storage medium of the computer system. The determination 340 can be made based on information in a cache index updated by the computer system, at 275 of the process 250, to store index points corresponding to respective portions of a media data item associated with the fragment $F_k(SP)$ cached on the persistent storage medium of the computer system, and corresponding storage location indicators to indicate where the respective portions of the media data item associated with the fragment $F_k(SP)$ are stored on the persistent storage medium of the computer system. In the example implementation illustrated in FIG. 1, the cache index is referred to as a seek point table (SPT.) As part of the determination 340, the computer system identifies one of the portions of the media data item associated with the fragment $F_k(SP)$, which contains the time offset $T_{SP}$ corresponding to the seek point SP within a time duration of the identified portion, as the portion of media data MD(SP) corresponding to the seek point SP. In this fashion, the computer system can verify whether the portion of media data MD(SP) corresponding to the seek point SP is cached on the persistent storage medium associated with the computer system. Because it was determined 315-Y that the computer system has downloaded, as part of the current media streaming session, the fragment $F_k(SP)$ that includes the portion of media data MD(SP) corresponding to the seek point SP, it is unlikely the portion of media data MD(SP) corresponding to the seek point SP is not cached on the persistent storage medium of the computer system. The latter situation may happen if the fragment $F_k(SP)$ that includes the portion of media data MD(SP) corresponding to the seek point SP has been cleared from cache because it was downloaded earlier than allowed by cache refresh/retention rules associated with the persistent storage medium of the computer system.

In response to determining 340-N that the portion of media data MD(SP) corresponding to the seek point SP is not cached on the persistent storage medium of the computer system, or in response to determining 315-N that the fragment $F_k(SP)$ corresponding to the seek point SP has not been downloaded by the computer system during the current streaming session, at 320, the computer system can request, from the server system, the fragment $F_k(SP)$ corresponding to the seek point SP. To request the fragment $F_k(SP)$ of the media document, the computer system can retrieve from the manifest received from the server system an indicator of storage location, on the persistent storage medium associated with the server system, corresponding to the fragment $F_k(SP)$. The storage location indicator retrieved from the manifest can be inserted by the computer system in an HTTP message transmitted 320 to the server system requesting the fragment $F_k(SP)$.

At 325, the requested fragment $F_k(SP)$ is received from the server system. In some implementations, the computer system receives the fragment $F_k(SP)$ as part of a response HTTP message from the server system. Further, the computer system can update the received fragment table (RFT) to indicate that the fragment $F_k(SP)$ has been received at the computer system as part of the current media streaming session.

At 330, the received fragment $F_k(SP)$ is cached on the persistent storage medium of the computer system. Because the fragment $F_k(SP)$ has been downloaded in response to a (most probably forward) seek request, the computer system can generate a new cache file and cache therein the received fragment $F_k(SP)$. Other fragments downloaded in progressive fashion, $F_{k+1}$, $F_{k+2}$, . . . after the fragment $F_k(SP)$ can be cached in the same, active cache file as $F_k(SP)$.

At 335, the cache index (or seek point table) is updated and a portion of media data MD(SP) corresponding to the seek point SP is identified from among portions of the media data item of the cached fragment $F_k(SP)$. The computer system has parsed the received fragment $F_k(SP)$ while caching 330 the same. The computer can generate index points corresponding to respective portions of a media data item associated with the parsed fragment $F_k(SP)$, as described above in connection with FIGS. 1 and 2B. To update 335 the cache index, the computer system writes the generated index points and their corresponding storage location indicators in the cache index. The storage location indicators indicate where the respective portions of the media data item associated with the fragment $F_k(SP)$ are stored on the persistent storage medium of the computer system. In addition, the computer system can identify one of the portions of the media data item associated with the parsed fragment $F_k(SP)$, which corresponds to a key frame having a time offset that precedes the time offset $T_{SP}$ of the seek point SP, as the portion of media data MD(SP) corresponding to the seek point SP.

In response to determining 340-Y that the portion of media data MD(SP) corresponding to the seek point SP is cached on the persistent storage medium of the computer system, or in response to identifying 335 the cached portion of media data MD(SP) corresponding to the seek point SP, at 345, the computer system can access the cached portion of media data MD(SP) corresponding to the seek point SP. At 350, the accessed portion of media data MD(SP) corresponding to the seek point SP is loaded from the persistent storage medium of the computer system to a memory buffer of the computer system. At 360, the computer system can playback the buffered portion of media data MD(SP) corresponding to the seek point SP.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

In this specification, an electronic document (which for brevity will simply be referred to as a document) may, but need not, correspond to a file. A document may be stored in a portion of a file that holds other documents, in a single file dedicated to the document in question, or in multiple coordinated files.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a client system from a server system, a manifest for a media document stored as multiple media document fragments on a persistent storage medium associated with the server system, each one of the multiple fragments having an associated time and comprising an associated media data item, the manifest comprising indicators of storage locations on the persistent storage medium associated with the server system corresponding to respective time offsets of the multiple fragments;
   requesting, based on the manifest, from the server system two or more fragments from among the multiple fragments using corresponding separate requests;
   receiving, from the server system, two or more responses including the respective two or more requested fragments;
   for each received fragment of the two or more received fragments,
      caching the received fragment on a persistent storage medium associated with the client system,
      generating two or more index points that correspond to respective portions of a media data item associated with the received fragment cached on the persistent storage medium associated with the client system, and
      storing, in a cache index, two or more indicators of storage locations on the persistent storage medium associated with the client system corresponding to the respective two or more generated index points;
   processing an instruction to play back a portion of a media data item associated with a cached fragment of the two or more fragments cached on the persistent storage medium associated with the client, the instruction including an index point from among the generated index points referenced by the cache index that corresponds to the portion of the media data item referenced by the instruction;
   retrieving, from the cache index and in response to the instruction, an indicator of a storage location on the persistent storage medium associated with the client system corresponding to the index point;
   accessing, at the storage location on the persistent storage medium associated with the client system, the portion of the media data item referenced by the instruction; and
   playing back the accessed portion of the media data item referenced by the instruction.

2. The method of claim 1, further comprising updating, for each fragment of the two or more received fragments, a data structure to indicate that the fragment has been received at the client system.

3. The method of claim 2, further comprising:
   receiving a seek point;
   checking the data structure to determine whether a given fragment of the multiple fragments corresponding to the seek point has been received at the client system;
   in response to determining that the given fragment has been received at the client system,
      retrieving, from the cache index, an indicator of a storage location on the persistent storage medium associated with the client system that corresponds to a given index point preceding the seek point from among the two or more index points that correspond to respective portions of a given media data item associated with the received given fragment, and
      accessing, at the storage location that corresponds to the given index point, a portion of the given media data item that corresponds to the given index point; and
   in response to determining that the given fragment has not been received at the client system,
      retrieving, from the manifest, an indicator of a storage location on the persistent storage medium associated with the server system that corresponds to a time offset of a given fragment of the multiple fragments corresponding to the seek point, and
      requesting, from the server system based on the storage location indicator retrieved from the manifest, the given fragment that corresponds to the seek point.

4. The method of claim 1, wherein, for each fragment of the two or more received fragments, said caching of the fragment on the persistent storage medium associated with the client system comprises
   determining whether a currently received fragment is sequential in time to a previously received fragment;
   in response to determining that the currently and previously received fragments are sequential in time, appending the currently received fragment to a single file that stores the previously received fragment; and in response to determining that the currently and previously received fragments are not sequential in time, storing the currently received fragment to another, different file.

5. The method of claim 1, wherein, for each fragment of the two or more received fragments, the two or more generated index points correspond to time offsets of respective two or more key frames of the media data item included in the fragment.

6. The method of claim 1, wherein the server system is an HTTP server system.

7. The method of claim 1, wherein the storage location indicators stored in the manifest include one or more of uniform resource locators or byte offsets corresponding to where respective fragments of the media document are stored on the persistent storage medium associated with the server system.

8. The method of claim 1, wherein, for each received fragment of the two or more received fragments, the storage location indicators stored in the cache index include one or more of an identifier of an associated file or byte offsets corresponding to where respective portions of the media item associated with the received fragment are cached on the persistent storage medium associated with the client system.

9. The method of claim 1, wherein the persistent storage medium associated with the client system comprises a storage device of the client system.

10. The method of claim 1, wherein the persistent storage medium associated with the client system comprises a circular buffer of a memory of the client system.

11. A non-transitory computer storage medium encoded with a computer program, the program comprising instructions that when executed by data processing apparatus cause the data processing apparatus to perform operations comprising:
receiving, from a server system, a manifest for a media document stored as multiple media document fragments on persistent storage medium associated with the server system, each one of the multiple fragments having an associated time and comprising an associated media data item, the manifest comprising indicators of storage locations on the persistent storage medium associated with the server system corresponding to respective times of the multiple fragments;
requesting, based on the manifest, from the server system two or more fragments from among the multiple fragments using corresponding separate requests;
receiving, from the server system, two or more responses including the respective two or more requested fragments;
for each received fragment of the two or more received fragments,
caching the received fragment on a persistent storage medium associated with the data processing apparatus,
generating two or more index points that correspond to respective portions of a media data item associated with the received fragment cached on the persistent storage medium associated with the data processing apparatus, and
storing, in a cache index, two or more indicators of storage locations on the persistent storage medium associated with the data processing apparatus that correspond to the respective two or more generated index points;
processing an instruction to play back a portion of a media data item associated with a cached fragment of the two or more fragments cached on the persistent storage medium associated with the data processing apparatus, the instruction including an index point from among the generated index points referenced by the cache index that corresponds to the portion of the media data item referenced by the instruction;
retrieving, from the cache index and in response to the instruction, an indicator of a storage location on the persistent storage medium associated with the data processing apparatus that corresponds to the index point;
accessing, at the storage location on the persistent storage medium associated with the data processing apparatus, the portion of the media data item referenced by the instruction; and
playing back the accessed portion of the media data item referenced by the instruction.

12. The non-transitory computer storage medium of claim 11, where the operations further comprise updating, for each fragment of the two or more received fragments, a data structure to indicate that the fragment has been received at the client system.

13. The non-transitory computer storage medium of claim 12, wherein the operations comprise:
receiving a seek point;
checking the data structure to determine whether a given fragment of the multiple fragments corresponding to the seek point has been received at the data processing apparatus;
in response to determining that the given fragment has been received at the data processing apparatus,
retrieving, from the cache index, an indicator of a storage location on the persistent storage medium associated with the data processing apparatus that corresponds to a given index point preceding the seek point from among the two or more index points that correspond to respective portions of a given media data item associated with the received given fragment, and
accessing, at the storage location that corresponds to the given index point, a portion of the given media data item that corresponds to the given index point; and
in response to determining that the given fragment has not been received at the data processing apparatus,
retrieving, from the manifest, an indicator of a storage location on the persistent storage medium associated with the server system that corresponds to a time of a given fragment of the multiple fragments corresponding to the seek point, and
requesting, from the server system based on the storage location indicator retrieved from the manifest, the given fragment that corresponds to the seek point.

14. The non-transitory computer storage medium of claim 11, wherein, for each fragment of the two or more received fragments, the operation of caching the fragment on the persistent storage medium associated with the data processing apparatus comprises
determining whether a currently received fragment is sequential in time to a previously received fragment;
in response to determining that the currently and previously received fragments are sequential in time, appending the currently received fragment to a single file that stores the previously received fragment; and
in response to determining that the currently and previously received fragments are not sequential in time, storing the currently received fragment to another, different file.

15. The non-transitory computer storage medium of claim 11, wherein, for each fragment of the two or more received fragments, the two or more generated index points correspond to times of respective two or more key frames of the media data item included in the fragment.

16. A computing device comprising:
one or more processors; and
one or more persistent storage media having instructions stored thereon that, responsive to execution by the one or more processors, configure the one or more processors to perform operations comprising:
obtaining a manifest from a remote media source, the manifest referring to storage locations where fragments of a media document are stored at the remote media source;
obtaining the fragments from the remote media source based on the manifest;
generating index points into a locally cached media item of the obtained fragments, the generated index points different from any index point of the manifest and based on the obtained fragments; and
playing the locally cached media item based on the generated index points.

17. The computing device of claim 16, further comprising receiving, from the remote media source, an indication of updates to the fragments that have been obtained.

18. The computing device of claim 16, wherein the playing further comprises:
receiving a seek point,
determining whether a given fragment corresponding to the seek point has been obtained,
accessing a locally cached portion of a media item of the given fragment responsive to the given fragment having been obtained, the accessed portion corresponding to a generated index point preceding the seek point, and
requesting from the remote media source based on the manifest responsive to the given fragment having not been obtained, the given fragment corresponding to the seek point.

19. The computing device of claim 16, wherein the caching the obtained fragments further comprises appending to a single file or storing to another file responsive to whether or not the currently received fragment is sequential in time to a previously received fragment, wherein the single file stores the previously received fragment.

20. The computing device of claim 16, wherein, for each fragment of the obtained fragments, the generated index points correspond to times of respective key frames of the media item included in the fragments.

* * * * *